(12) United States Patent
Edelen et al.

(10) Patent No.: US 7,265,458 B2
(45) Date of Patent: Sep. 4, 2007

(54) APPARATUS AND METHODS FOR COORDINATED STATIC SWITCH OPERATIONS FOR LOAD TRANSFERS IN UNINTERRUPTIBLE POWER SUPPLY SYSTEMS

(75) Inventors: Daniel Ray Edelen, Clayton, NC (US); Angelo Louis Mandarino, Raleigh, NC (US)

(73) Assignee: Eaton Power Quality Corporation, Cleveland, OH (US)

( * ) Notice: Subject to any disclaimer, the term of this patent is extended or adjusted under 35 U.S.C. 154(b) by 52 days.

(21) Appl. No.: 11/101,980

(22) Filed: Apr. 8, 2005

(65) Prior Publication Data

US 2006/0226706 A1    Oct. 12, 2006

(51) Int. Cl.
*H02J 9/00* (2006.01)
(52) U.S. Cl. ....................................................... 307/65
(58) Field of Classification Search .................. 307/64, 307/65
See application file for complete search history.

(56) References Cited

U.S. PATENT DOCUMENTS

| | | | | |
|---|---|---|---|---|
| 4,340,823 A | * | 7/1982 | Miyazawa | 307/66 |
| 5,210,685 A | * | 5/1993 | Rosa | 363/109 |
| 6,292,379 B1 | * | 9/2001 | Edevold et al. | 363/71 |
| 7,061,141 B2 | * | 6/2006 | Yamamoto | 307/65 |
| 2005/0168073 A1 | * | 8/2005 | Hjort | 307/65 |
| 2005/0288826 A1 | * | 12/2005 | Tassitino et al. | 700/295 |

OTHER PUBLICATIONS

A white paper by Liebert Corporation, Maximum Availability at Minimal Cost, http://www.liebert.com/support/whitepapers/documents/lbtspmax.asp, Printed Mar. 30, 2005, 8 pages.

* cited by examiner

*Primary Examiner*—Michael Sherry
*Assistant Examiner*—Michael Rutland-Wallis
(74) *Attorney, Agent, or Firm*—Myers Bigel Sibley & Sajovec PA

(57) ABSTRACT

A power supply apparatus includes an uninterruptible power supply (UPS) having an input configured to be coupled to a first power source and an output configured to be coupled to a load and a first static switch configured to provide a switchable bypass path from the first power source to the load. The apparatus further includes a second static switch controllable to provide a switchable path between the load and a second power source, and a controller circuit configured to cooperatively control the first and second static switches to transfer the load to the second power source. The controller circuit may be operative to transition the load from a first state wherein the load receives power from the first power source via the first static switch to a second state wherein the load receives power from the second power source while isolated from the first power source.

13 Claims, 5 Drawing Sheets

APPARATUS AND METHODS FOR COORDINATED STATIC SWITCH OPERATIONS FOR LOAD TRANSFERS IN UNINTERRUPTIBLE POWER SUPPLY SYSTEMS

BACKGROUND OF THE INVENTION

The present invention relates to power supply apparatus and methods and, more particularly, to apparatus and methods for transferring loads among multiple power sources.

A "reverse transfer" or "on-line" uninterruptible power supply (UPS) may be used to provide protected power to a load. As shown in FIG. 1, a typical on-line UPS 110 includes a rectifier 112 that is configured to be coupled to an AC power source 10 and to produce a DC voltage therefrom. The DC voltage is applied to an inverter 114, which generates an AC voltage for a load 20 coupled thereto. An alternative power source, e.g., a battery 116, may be coupled to the intermediate DC link to provide power to the inverter 114 in the event of failure of the AC power source 10. If the UPS 110 fails or is taken off line for maintenance, a high-speed solid-state static switch 120, which, as shown, may include anti-parallel connected silicon controlled rectifiers (SCRs) or other solid-state circuits that provide similar switching capabilities, may be used to provide a bypass path between the power source 10 and power to the load 20. The high-speed nature of the static switch 120 allows the load 20 to be transferred to the main source 10 with little or no interruption. In some applications, the static switch 120 may be integrated with the UPS 110 while, in other applications, the static switch 120 may be a separate device. As shown, a lower-speed switching device 130, such as switch, relay or circuit breaker, may be provided to allow for bypassing of the static switch 120. Other switches/breakers 118 may be provided for isolation and/or circuit protection.

Static switches may also be used to provide for transfer of loads among UPSs. Referring to FIG. 2, a first UPS 110a, here shown as including bypass static switch and other isolation/circuit protection devices, may be coupled to a first power source 10a and switchably coupled to a first load 20a via a static switch 212 of a first static transfer switch (STS) 210a and to a second load 20b via a static switch 212 of a second STS 210b. Similarly, a second UPS 110b may be coupled to a second power source 10b and switchably coupled to the first load 20a via a static switch 212 of the first STS 210a and to the second load 20b via a static switch 212 of the second STS 210b. A switch/breaker 220 may be provided between the outputs of the UPSs 110a, 110b.

The STSs 210a, 210b allow for transfer of the loads 20a, 20b between the first and second UPSs 110a, 110b by providing for selective coupling therebetween. In particular, at a given time, one static switch 212 in each STS 210a, 210b is activated to provide power to one of the loads 20a, 20b, while the other static switch 212 isolates the same load from the other power source. Each of the STSs 210a, 210b can transfer a load in an uninterrupted manner by substantially simultaneously turning off the active static switch and turning on the inactive static switch. The STSs 210a, 210b are typically built as integrated units that include electronic circuits to monitor voltages applied to the loads 20a, 20b and responsively control the static switches 212. It will be appreciated that, although FIG. 2 illustrates dual STSs 210a, 210b, STSs with more than two static switches 212 may be used in applications in which more than two UPSs (or other power sources) are to be interconnected. A relatively less complex load transfer capability has also been provided in conventional systems by using a single static transfer switch that is coupled between two UPS outputs (or other power sources) and that operates responsive to a voltage at one or both of the outputs.

SUMMARY OF THE INVENTION

In some embodiments of the present invention, a power supply apparatus includes an uninterruptible power supply (UPS) having an input configured to be coupled to a first power source and an output configured to be coupled to a load. The apparatus also includes a first static switch configured to provide a switchable bypass path from the first power source to the load. The apparatus further includes a second static switch controllable to provide a switchable path between the load and a second power source, and a controller circuit configured to cooperatively control the first and second static switches to transfer the load to the second power source. The controller circuit may be operative to transition the load from a first state wherein the load receives power from the first power source via the first static switch to a second state wherein the load receives power from the second power source while isolated from the first power source. In particular, the controller circuit may be configured to cooperatively open the first static switch and close the second static switch to transition the load from the first state to the second state.

In further embodiments, the UPS is a first UPS having an output configured to be coupled to a first load, and the apparatus further includes a second UPS having an input configured to be coupled to the second power source and an output configured to be coupled to a second load and a third static switch controllable to provide a switchable bypass path between the second power source and the second load. The controller circuit is further configured to control the first and second static switches to transition the first load from the first state to the second state, wherein the first load in the second state receives power from the second power source via the second UPS and/or the third static switch while isolated from the first power source. The controller circuit may be further configured to cooperatively control the second and third static switches to transfer the second load to the first power source.

According to some embodiments, the controller circuit includes a first static switch controller circuit configured to operate the first static switch responsive to a first control signal and a second static switch controller circuit configured to operate the second static switch responsive to a second control signal. A third static switch controller circuit is configured to generate the first and second control signals. The first static switch controller circuit and/or the second static switch controller circuit may include a communications interface configured to receive messages from a digital communications bus, and the first control signal and/or the second control signal may include a message communicated over the digital communications bus. In some embodiments, the first static switch controller circuit and/or the second static switch controller circuit may be integrated with the load transfer controller circuit in a common assembly. In further embodiments, the UPS, the first static switch and the first static switch controller circuit are integrated in a common assembly.

In additional embodiments of the present invention, an apparatus is provided for controlling load transfers in a power supply system including an uninterruptible power supply (UPS) having an input configured to be coupled to a first power supply and an output configured to be coupled to a load, a first static switch controllable to provide a switchable bypass path between the first power source and the load and a second static switch controllable to provide a switchable path between the load and a second power source. The apparatus includes a static switch controller circuit configured to cooperatively control the first and second static switches to transfer a load coupled to the output of the UPS to the second power source.

In some embodiments of the present invention, methods are provided for operating a power supply apparatus that includes an uninterruptible power supply (UPS) having an input configured to be coupled to a first power source and an output configured to be coupled to a load, a first static switch controllable to provide a switchable bypass path between the first power source and the load, and a second static switch controllable to provide a switchable path between the load and a second power source. The methods include cooperatively controlling the first and second static switches to transfer the load to the second power source. Cooperatively controlling the first and second static switches to transfer the load to the second power source may include controlling the first and second static switches to transition the load from a first state wherein the load receives power from the first power source via the first static switch to a second state wherein the load receives power from the second power source while isolated from the first power source. Controlling the first and second static switches to transition the load from a first state wherein the load receives power from the first power source via the first static switch to a second state wherein the load receives power from the second power source while isolated from the first power source may include cooperatively opening the first static switch and closing the second static switch to transition the load from the first state to the second state.

In further embodiments, the UPS includes a first UPS having an output configured to be coupled to a first load, and the power supply system further includes a second UPS having an input configured to be coupled to the second power source and an output configured to be coupled to a second load and a third static switch controllable to provide a switchable bypass path between the second power source and the second load. Controlling the first and second static switches to transition the load from a first state wherein the load receives power from the first power source via the first static switch to a second state wherein the load receives power from the second power source while isolated from the first power source includes controlling the first and second static switches to transition the load from the first state to the second state, wherein the load in the second state receives power from the second power source via the second UPS and/or the third static switch while isolated from the first power source. The methods may further include cooperatively controlling the second and third static switches to transfer the second load to the first power source.

DETAILED DESCRIPTION OF EXEMPLARY EMBODIMENTS

Figure 1:
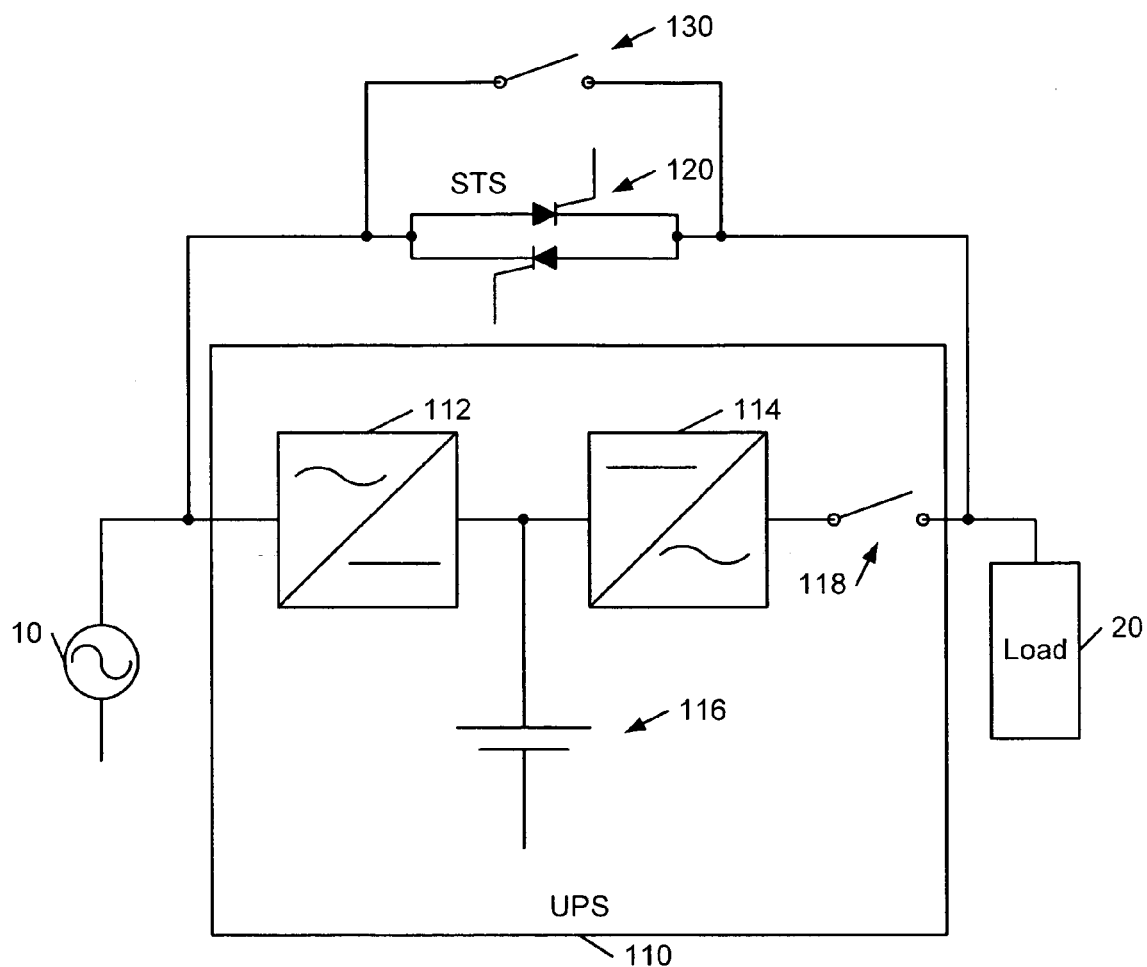
FIG. 1 illustrates a conventional UPS with bypass capability.
Figure 2:
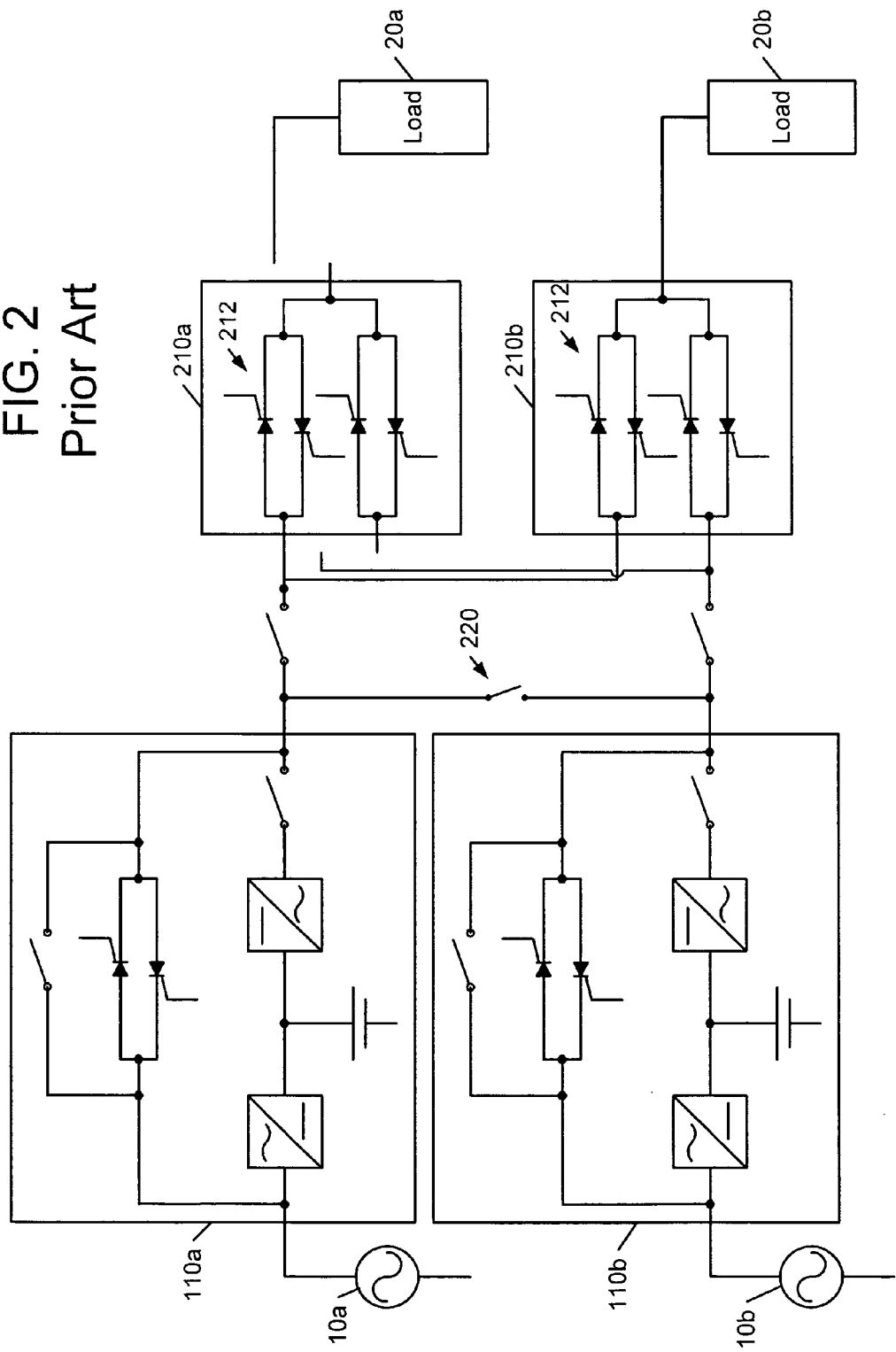
FIG. 2 illustrates conventional use of static transfer switches (STSs) to provide load transfer capability for interconnected UPSs.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As referred to herein, a "static switch" refers to a switching device with a solid-state (i.e., mechanically "static") switching element that may be used for power distribution applications. Such devices are typically capable of transitioning between open and closed states in an amount of time that supports substantially uninterrupted provision of power to a connected load. It will be appreciated that static switches may include, but are not limited to, devices including anti-parallel connected silicon-controlled rectifiers (SCRs) or other thyristor devices, as well as other types of semiconductor switching devices that provide substantially similar switching capability. It will be further appreciated that, in various embodiments, a "static switch" may also include electronic circuits, such as control circuits for firing SCRs or other semiconductor devices, that support static switch operations, as well as mechanical switches or breakers that may be used for isolation or bypass functions.

Some embodiments of the present invention arise from a realization that reduced cost and/or improved reliability in redundant power distribution systems may be provided by coordinating operations of a static switch that serves as a UPS bypass with operations of a static switch that serves as an inter-bus tie to allow for load transfers between power sources. Thus, for example, in parallel UPS installations, STSs coupled to the UPS outputs can be eliminated while still providing redundancy. The elimination of these STSs can significantly reduce system cost and improve system reliability by eliminating a potential serial point of failure.

Figure 3:
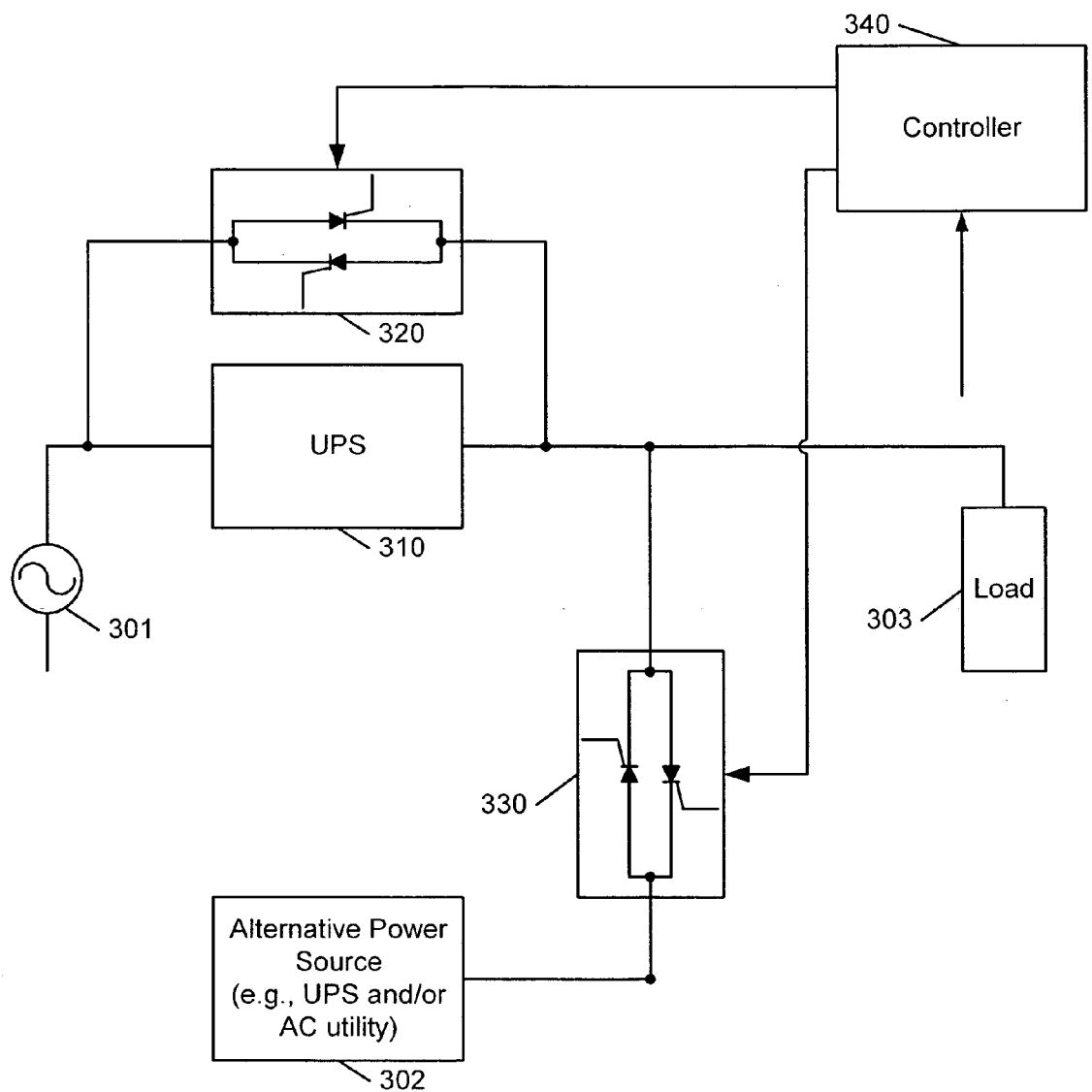
FIG. 3 is a schematic diagram illustrating apparatus and operations for load transfer for a UPS according to some embodiments of the present invention.

FIG. 3 illustrates power supply apparatus and operations according to some embodiments of the present invention. A UPS 310 has an input configured to be coupled to a first power source 301 (e.g., an AC utility) and an output configured to be coupled to a load 303. It will be appreciated that other devices, such as mechanical switches, relays, or the like, may or may not be present between the first power source 301 and the UPS 310 and/or between the UPS 310 and the load 303. A first static switch 320 is controllable to provide a switchable bypass path from the first power source 301 to the output of the UPS 310. A second static switch 330 is controllable to provide a switchable path between the load 303 and a second, alternative power source 302. A controller 340 is configured to cooperatively control the first and second static switches 320, 330 to uninterruptedly transfer the load 303 to the second power source 302.

The controller 340 may control the static switches 320, 330 responsive to various system states, such as voltage at the first power source 301, the second power source 302 and/or the load 303. The cooperative operation of the static switches 320, 330 may occur in any of a number of different ways. For example, the switches 320, 330 may be operated substantially simultaneously, in a "make before break" fashion and/or in a "break before make" fashion. The switches 320, 330 may be driven independently and/or may operate in an interdependent fashion, for example, the controller 340 may include circuitry that operates a first one of the switches 320, 330 responsive to operation of a second one of the switches 320, 330, such as by sensing a state of the second one of the switches 320, 330. It will be appreciated that the UPS 310 may be a single unit or may include a plurality of paralleled UPS units. The second power source 302 may include, for example, another UPS and/or an AC utility source switchably coupled to the second static switch 330 by another switching device.

Figure 4:
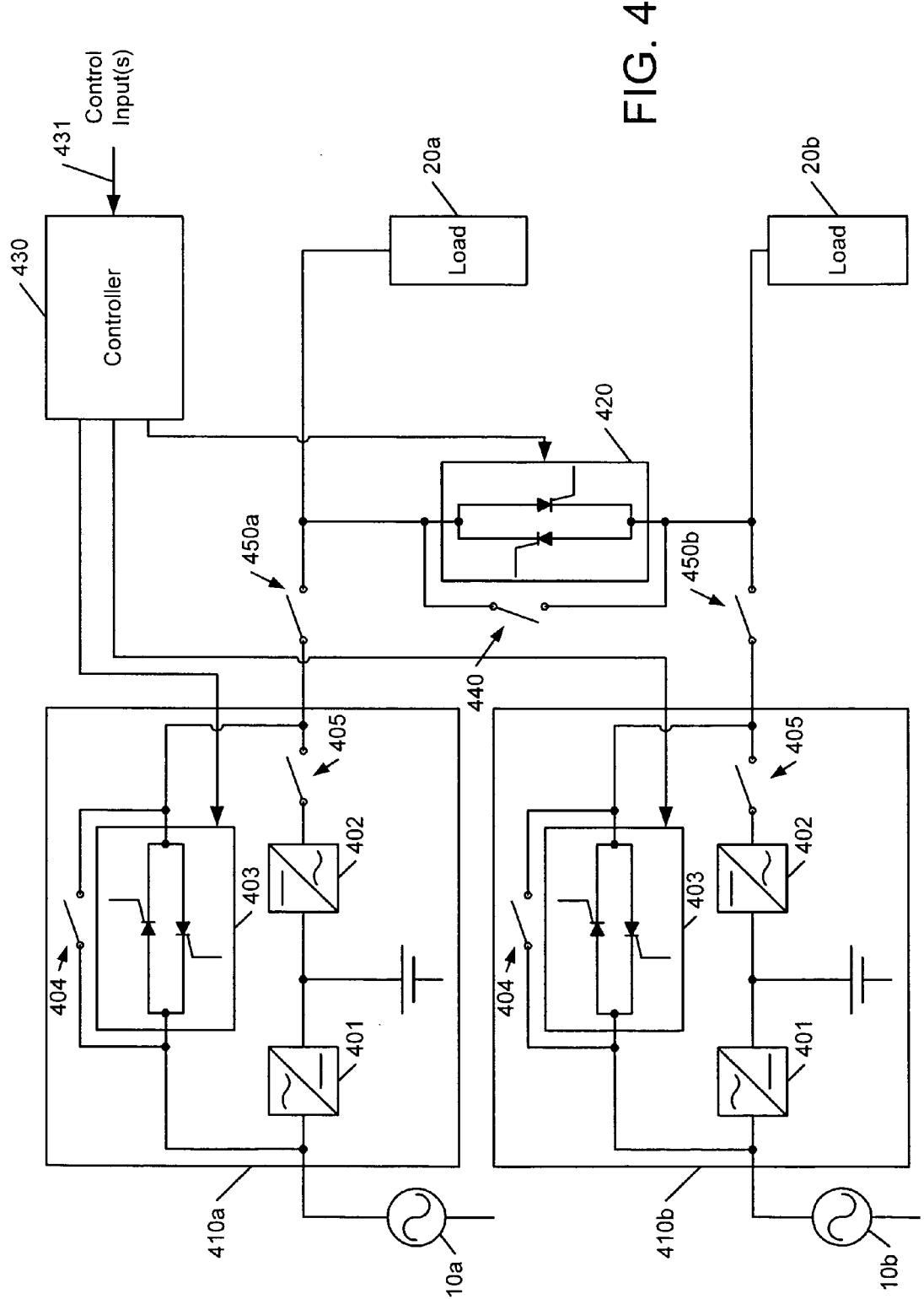
FIG. 4 is a schematic diagram illustrating apparatus and operations for load transfer among UPSs according to further embodiments of the present invention.

FIG. 4 illustrates an exemplary implementation according to further embodiments of the present invention. First and second UPS systems 410a, 410b include rectifiers 401, inverters 402 and integrated bypass static switches 403, along with other switches/breakers 404, 405. The first UPS system 410a has its input coupled to a first AC power source 10a, and normally serves a first load 20a via a switch/breaker 450a. Similarly, the second UPS system 410b has its input coupled to a second AC power source 10b, and normally serves a second load 20b via a switch/breaker 450b. A static switch 420 is coupled between the first and second loads 20a, 20b and is controllable to provide a switchable path between the first load 20a and the second power source 10b via the static switch 404 and/or the rectifier 401 and inverter 402 of the second UPS system 410b. Similarly, the static switch 420 provides a switchable path between the second load 20b and the first power source 10a via the static switch 404 and/or the rectifier 401 and inverter 402 of the first UPS system 410a. A controller 430 cooperatively controls the static switches 404 of the first and second UPS systems 410a, 410b and the static switch 420 responsive to one or more control inputs 431, such that the first load 20a and/or the second load 20b may be transferred between the first and second UPS systems 410a, 410b.

For example, if the first UPS system 410a is powering the first load 20a in a bypassed mode, e.g., the static switch 404 of the first UPS system 410a is closed, and failure of the first power source 10a is detected, the controller 430 may substantially simultaneously open the static switch 404 of the first UPS system 410a and close the static switch 420 to provide uninterrupted transfer of the first load 20a to the second UPS system 410b. Similarly, if the second UPS system 410b is powering the second load 20b in a bypassed mode and failure of the second power source 10b is detected, the controller 430 may substantially simultaneously open the static switch 404 of the second UPS system 410b and close the static switch 420 to provide uninterrupted transfer of the second load 20b to the first UPS system 410a. It will be appreciated that the control inputs 431 may include any of a variety of system states, such as voltages at the first and second loads 10a, 10b and/or voltages of the first and second power sources 10a, 10b, and that the transfer operations of the controller 430 may be conditioned upon any of a variety of criteria, such as voltage magnitude, voltage frequency, waveform quality and the like.

Figure 5:
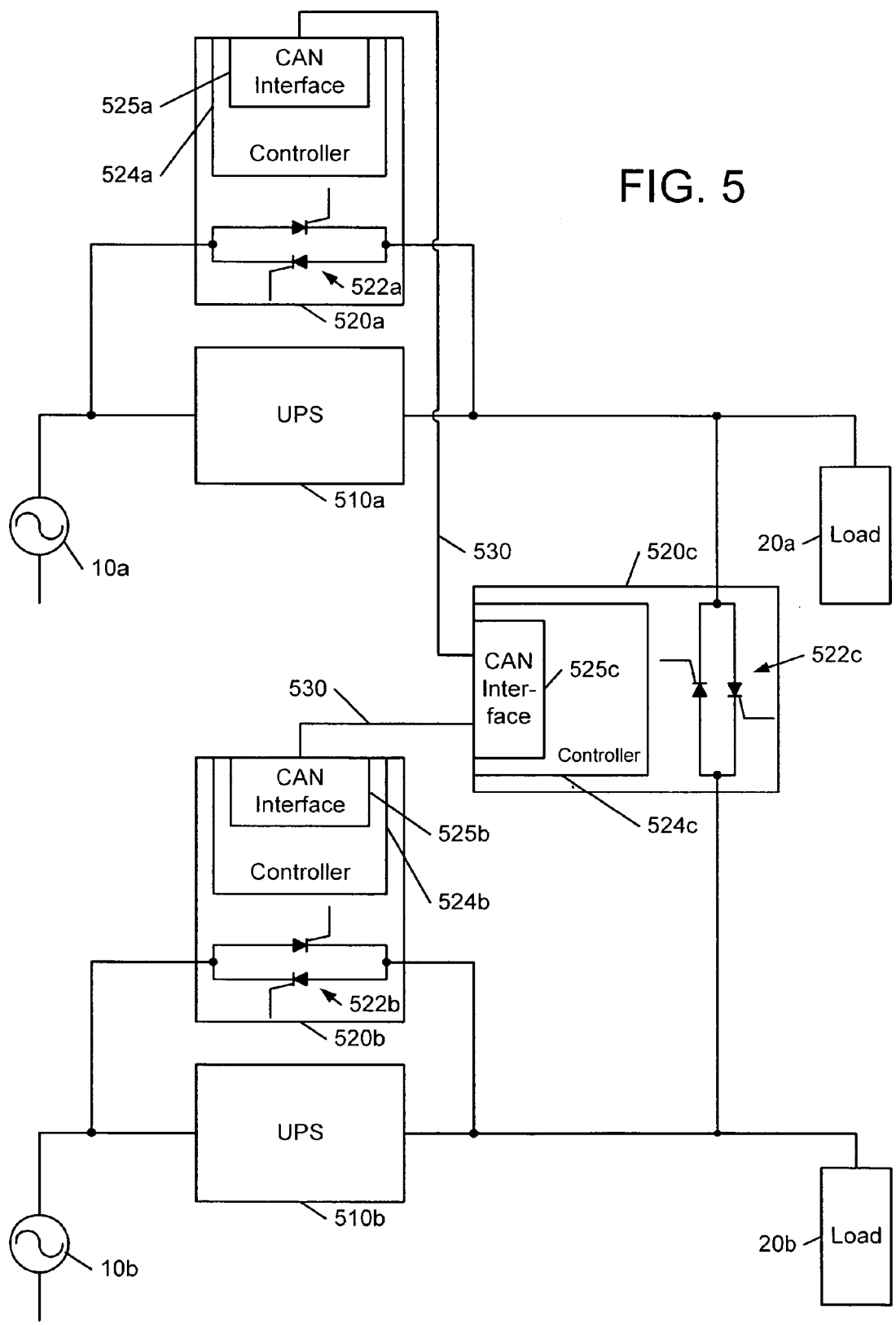
FIG. 5 is a schematic diagram illustrating apparatus and operations for load transfer among UPSs using static switches interconnected by a communications bus according to further embodiments of the present invention.

FIG. 5 illustrates other exemplary embodiments of the present invention, in which static switches are controlled via digital communications links. First and second UPSs 510a, 510b have inputs coupled to respective first and second AC power sources 10a, 10b and outputs coupled to respective first and second loads 20a, 20b (further elements, such as isolation switches/breakers, may be present). Respective first and second static switches 520a, 520b are controllable to provide respective switchable bypass paths for the first and second UPSs 510a, 510b, while a third static switch 520c is controllable to provide a switchable path between the first UPS 510a/first static switch 520a and the second load 20b and between the second UPS 510b/second static switch 520b and the first load 20a. The first, second and third static switches 520a, 520b, 520c include respective static switch elements 522a, 522b, 522c and respective first, second and third static switch controllers 524a, 524b, 524c, each of which includes a communications interface, here shown as Controller Area Network (CAN) interfaces 525a, 525b, 525c. CAN is a serial bus system developed by Robert Bosch GmbH and is the subject of the ISO 11898 international standard.

The first, second and third static switch controllers 524a, 524b, 524c may include, for example, drive circuitry and other electronics that control the first, second and third static switch elements 522a, 522b, 522c responsive to messages received via the CAN interfaces 525a, 525b, 525c and/or other signal inputs, such as sensor signal inputs. As shown, the first and second static switch controllers 524a, 524b may be controlled by the third static switch controller 524c. For example, the third static switch controller 524c many sense voltages or other conditions that warrant load transfer, and may responsively issue command messages to the first static switch controller 524a and/or the second static switch controller 524c via communications busses 530 to control the first static switch 520a and/or the second static switch 520b in cooperation with the third static switch 520c to achieve uninterrupted transfer of the first load 20a and/or the second load 20b between the first and second power sources 10a, 10b.

It will be understood that static switch control circuitry in various embodiments of the present invention may be configured in various different ways. In some embodiments, for example, the first and second static switches 520a, 520b may be integrated with the respective first and second UPSs 510a, 510b, and the third static switch 520c may be a separate assembly which is configured to be connected (e.g., by serial busses) to communications interfaces of the integrated UPS/static switch units. In such embodiments, the third static switch controller 524c may, for example, include voltage or other sensors and associated electronics that monitor voltage or other conditions and electronic control circuits that responsively control power switching operations of the first, second and third static switches 520a, 520b, 520c. It will be appreciated, however, that other control configurations fall within the scope of the present invention. For example, instead of having a static switch controller 524c associated with the inter-bus static switch 520c act as a monitor/master device as discussed above, one of the first static switch controller 524a or the second static switch controller 524b could serve in the monitor/master role. In further embodiments, the first and second static switches 520a, 520b and associated controllers 524a, 524b could be separate assemblies configured to be connected in parallel with the UPSs 510a, 510b.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A power supply apparatus, comprising:
    an uninterruptible power supply (UPS) having an input configured to be coupled to a first power source and an output configured to be coupled to a load;
    a first static switch configured to provide a switchable bypass path from the first power source to the load;
    a second static switch controllable to provide a switchable path between the load and a second power source other than the UPS; and
    a controller circuit configured to cooperatively control the first and second static switches to transfer the load to the second power source,
    wherein the controller circuit is operative to transition the load from a first state wherein the load receives power from the first power source via the first static switch to a second state wherein the load receives power from the second power source while isolated from the first power source, and
    wherein the UPS comprises a first UPS having an output configured to be coupled to a first load, and wherein the apparatus further comprises a second UPS having an input configured to be coupled to the second power source and an output configured to be coupled to a second load and a third static switch controllable to provide a switchable bypass path between the second power source and the second load, wherein the controller circuit is further configured to control the first and second static switches to transition the first load from the first state to the second state, and wherein the first load in the second state receives power from the second power source via the second UPS and/or the third static switch while isolated from the first power source.

2. An apparatus according to claim 1, wherein the controller circuit is further configured to cooperatively control the second and third static switches to transfer the second load to the first power source.

3. An apparatus according to claim 1, wherein the controller circuit cooperatively controls the first and second static switches responsive to a voltage.

4. An apparatus according to claim 1, wherein the controller circuit comprises:
    a first static switch controller circuit configured to operate the first static switch responsive to a first control signal;
    a second static switch controller circuit configured to operate the second static switch responsive to a second control signal; and
    a load transfer controller circuit configured to generate the first and second control signals.

5. An apparatus according to claim 4, wherein the first static switch controller circuit and/or the second static switch controller circuit comprises a communications interface configured to receive messages from a digital communications bus, and wherein the first control signal and/or the second control signal comprises a message communicated over the digital communications bus.

6. An apparatus according to claim 5, wherein the communications bus comprises a controller area network (CAN) bus.

7. An apparatus according to claim 4, wherein the first static switch controller circuit and/or the second static switch controller circuit is integrated with the load transfer controller circuit in a common assembly.

8. An apparatus according to claim 4, wherein the UPS, the first static switch and the first static switch controller circuit are integrated in a common assembly.

9. An apparatus for controlling load transfers in a power supply system including an uninterruptible power supply (UPS) having an input configured to be coupled to a first power supply and an output configured to be coupled to a load, a first static switch controllable to provide a switchable bypass path between the first power source and the load and a second static switch controllable to provide a switchable path between the load and a second power source other than the UPS, the apparatus comprising:
    a controller circuit configured to cooperatively control the first and second static switches to transfer a load coupled to the output of the UPS to the second power source,
    wherein the controller circuit is operative to transition the load from a first state wherein the load receives power from the first power source via the first static switch to a second state wherein the load receives power from the second power source while isolated from the first power source, and
    wherein the UPS comprises a first UPS having an output configured to be coupled to a first load, wherein the power supply system further includes a second UPS having an input configured to be coupled to the second power source and an input configured to be coupled to a second load and a third static switch controllable to provide a switchable bypass path between the second power source and the second load, wherein the controller circuit is further configured to control the first and second static switches to transition the load from the first state to the second state, wherein the load in the second state receives power from the second power source via the UPS and/or the third static switch while isolated from the first power source.

10. An apparatus according to claim 9, wherein the controller circuit is further configured to cooperatively control the second and third static switches to transfer the second load to the first power source.

11. An apparatus according to claim 9, wherein the controller circuit cooperatively controls the first and second static switches responsive to a voltage.

12. A method of operating a power supply apparatus that includes an uninterruptible power supply (UPS) having an input configured to be coupled to a first power source and an output configured to be coupled to a load, a static switch controllable to provide a switchable bypass path between the first power source and the load, and a second static switch controllable to provide a switchable path between the load and a second power source other than the UPS, the method comprising:

cooperatively controlling the first and second static switches to transfer the load to the second power source, wherein cooperatively controlling the first and second static switches to transfer the load to the second power source comprises controlling the first and second static switches to transition the load from a first state wherein the load receives power from the first power source via the first static switch to a second state wherein the load receives power from the second power source while isolated from the first power source, and wherein the UPS comprises a first UPS having an output configured to be coupled to a first load, wherein the power supply system further includes a second UPS having an input configured to be coupled to the second power source and an output configured to be coupled to a second load and a third static switch controllable to provide a switchable bypass path between the second power source and the second load, and wherein controlling the first and second static switches to transition the load from a first state wherein the load receives power from the first power source via the first static switch to a second state wherein the load receives power from the second power source while isolated from the first power source comprises controlling the first and second static switches to transition the load from the first state to the second state, wherein the load in the second state receives power from the second power source via the second UPS and/or the third static switch while isolated from the first power source.

13. A method according to claim 12, further comprising cooperatively controlling the second and third static switches to transfer the second load to the first power source.

* * * * *